United States Patent [19]

Richardson

[11] Patent Number: 4,645,066
[45] Date of Patent: Feb. 24, 1987

[54] ADJUSTABLE CONVEYOR ASSEMBLY FOR REGULAR PERIODIC TRANSVERSE MOVEMENT OF A LONGITUDINALLY MOVING CONVEYOR BELT

[75] Inventor: Walter L. Richardson, Pointe Claire, Canada

[73] Assignee: Northern Telecom Limited, Montreal, Canada

[21] Appl. No.: 752,749

[22] Filed: Jul. 8, 1985

[51] Int. Cl.⁴ .............................................. B65G 21/10
[52] U.S. Cl. ................................. 198/631; 474/105; 226/21; 226/23; 198/807
[58] Field of Search ..................... 198/807, 806, 631; 226/18, 21, 22, 23; 474/105

[56] References Cited

U.S. PATENT DOCUMENTS

| | | | |
|---|---|---|---|
| 653,293 | 7/1900 | Gilbert et al. | 474/105 |
| 694,368 | 3/1902 | Gilbert et al. | 474/105 |
| 1,205,661 | 11/1916 | Plansoen | 198/807 X |
| 1,791,288 | 2/1931 | Schweitzer | 226/21 X |
| 1,879,962 | 9/1932 | Trempe | 474/105 |
| 3,552,617 | 1/1971 | Jacobsen | 226/22 |

*Primary Examiner*—Joseph E. Valenza
*Assistant Examiner*—Jonathan D. Holmes
*Attorney, Agent, or Firm*—R. J. Austin

[57] ABSTRACT

A conveyor assembly having one of its conveyor rollers which is movable to change the angle of its axis to the conveyor direction for causing sideways movement of the conveyor belt. Movement of the roller is controlled by a linkage drivably connected to a ratchet nut riding on a threaded spindle to move one end of the roller sideways on a carriage. A linkage adjustment arrangement is provided to adjust the degree of driving engagement of the linkage with the ratchet-nut.

4 Claims, 8 Drawing Figures

ADJUSTABLE CONVEYOR ASSEMBLY FOR REGULAR PERIODIC TRANSVERSE MOVEMENT OF A LONGITUDINALLY MOVING CONVEYOR BELT

This invention relates to conveyor assemblies.

To provide a telecommunications conductor with pulp insulation, the conductor is conventionally moved around a drum or cylinder mold in a pulp vat. During its movement around the drum, pulp is deposited upon the conductor by movement of a slurry through the drum from side-to-side in the vat whereby the conductor is embedded within a controlled width of pulp ribbon which is then further processed. To further process this ribbon, it is carried upon a conveyor to a polishing operation in which the ribbon, formed as two "wings" has its wings turned around the conductor so as to form a substantially annular insulation layer concentrically surrounding the conductor. In this process which has been used since the early 1930's, a plurality of conductors have been processed simultaneously in this way with the conductors spaced laterally of each other as they move through the vat, around the drum and along the conveyor.

It has been a longstanding problem that the provision of pulp insulation upon a conductor in the above-described conventional way has caused an uneven wear along the length of the conveyor. This is because the conductors each occupy a certain lateral position on the conveyor as each conductor is fed from an exact location on the cylinder drum to an exact location in the polishing apparatus. As a result of this uneven wear, conveyors are scrapped whilst they have certain regions lying between the pulp ribbons which have not been contacted by the pulp ribbons or conductors and show no wear upon the carrying surfaces.

In an attempt to overcome the above problem, conveyors have been produced and marketed in which a conveyor support roller has been movable to change its angle relative to the direction of movement of the belt thus to place a sideways force on the belt and cause its displacement transversely while it is being driven. The roller has been movable alternately in one direction and then in the other to change this angle by a linkage consisting of a single link having two arms which straddle a ratchet nut which is engaged with a screw-threaded shaft rotatable in a support. The link is pivotal between two operating positions by a triggering means dependent upon the lateral position of the belt so as to engage one arm or the other with either side of the ratchet nut. Rotation of the roller then reciprocates the link and, dependent upon the side of the ratchet nut it engages, the nut and thus the support and one end of the roller are moved to move the roller in one or other direction so as to change its angle subtended to the direction of conveyor movement. A problem which has been found with this structure, however, is that after a period of wear, the link may fail to move correctly to one or other of its two operating positions thereby failing to engage the ratchet nut. Angular movement of the roller then ceases thus resulting in a return to the uneven wear problem of the conveyor.

The provision of pulp ribbons upon conductors as described above is one example of the movement of laterally narrow articles of indefinite length along conveyors and which produce wear only in certain specific locations leading to the early scrapping of the conveyor belts.

The present invention is concerned with a conveyor assembly in which the above disadvantages are either avoided or reduced by ensuring that a conveyor belt has a more overall wear across its carrying surface when conveying narrow articles of indefinite length.

Accordingly, the present invention provides a conveyor assembly comprising a conveyor belt and a plurality of conveyor belt supporting rollers, one of said rollers being movable to change the angle subtended between its axis and the direction of movement of the belt to place a sideways force on the belt and cause its displacement transversely while it is being driven, roller moving means for regularly periodically moving the roller in one direction to change the subtended angle from a first extreme angle at one side of a line normal to the direction of movement of the belt to a second extreme angle at the opposite side of said line normal to the direction of movement of the belt and then in the opposite direction to change said subtended angle from the second extreme angle to the first extreme angle so as to effect a regular periodic alternating transverse movement of the belt from one to another of two extreme positions of lateral displacement, the roller moving means comprising a screw-threaded spindle; a ratchet nut threaded onto the spindle and having ratchet teeth on each of two oppositely facing radial surfaces; a linkage comprising a first link and a second link connected to the first link to pivot together with the first link about a common pivot point, the second link having two arms, one arm extending along each radial surface of the nut, the linkage being pivotable between two actuating positions and in each actuating position, an arm being actuably connected to the ratchet teeth on one radial surface to rotate the ratchet nut in one direction, to move it in an appropriate direction along the threaded spindle, with each actuating position of the linkage effecting an opposite directional movement of the ratchet nut from the other actuating position, one end of the roller transversely movable with its bearing upon a support together with the ratchet nut as it moves along the threaded spindle; linkage adjustment means operable to adjust the relative positions of the first link and the second link around the common pivot point to thereby adjust the degree of driving engagement of the second link with the ratchet nut; and a triggering means operable upon the belt reaching a certain location during its movement towards either extreme position of lateral displacement for pivoting the linkage between its two actuating positions to change the direction of rotation of the ratchet nut and hence the direction of movement of the roller.

With the above assembly, the arrangement should be such that an infinitesimally small lateral movement of the belt is produced as compared to the longitudinal movement of the belt, so that an insignificant sideways force is produced upon articles being carried by the belt whereby such articles are not displaced sideways from their true feedpath between certain locations in a processing line. As an example of this, a belt may be moved laterally from side-to-side at a rate such that it moves, for instance, perhaps by only 0.25 inches for movement of hundreds of feet of the conveyor along its path. Hence with this type of movement, the conveyor will gradually move laterally beneath the feedpath of any article being carried upon it so that the article makes contact progressively in a lateral direction across the conveyor. It follows that wear upon the conveyor does not occur at exactly the same lateral location during use of the conveyor but is dispersed more evenly across the conveyor surface. Hence the conveyor does not wear unduly in one position and a more overall wear on the conveyor surface clearly produces a longer life to the use of the conveyor.

One embodiment of the invention will now be described by way of example, with reference to the accompanying drawings in which.

Figure 1:
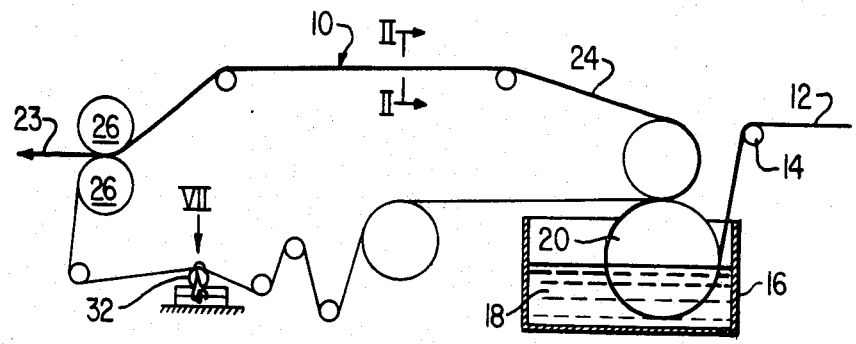
FIG. 1 is a diagrammatic side elevational view of part of the apparatus for providing a plurality of conveyors with layers of pulp insulation.
Figure 2:
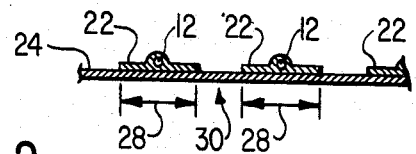
FIG. 2 is a cross-sectional view through the apparatus of FIG. 1 and showing the relative sideways location of conductors having pulp ribbons provided thereon and on a larger scale.

As shown by FIG. 1, there is provided an apparatus 10 for forming a pulp insulation upon a plurality of electrical conductors 12, one only of which is shown in side elevation as the conductors are laterally spaced across the feedpath and are superimposed upon one another. The conductors 12 are fed around a guide roller 14 and into a pulp vat 16 in which they are immersed within a pulp slurry 18 as they pass around a cylinder mold 20 which is of conventional construction. The cylinder mold has sufficient axial length as is normal, to accommodate all of the conductors in side-by-side relationship as they are passed through the vat. No further description on the operation of the vat and cylinder mold is necessary because of the conventional arrangement. The conductors upon leaving the vat are covered with pulp ribbons 22 also of conventional construction. Pulp ribbons 22 surrounding certain of the conductors are shown in FIG. 2 and, as may be seen, these pulp ribbons have sideways extending "wings", which contact a conveyor 24 as the pulp covered conductors 23 move through the apparatus on the conveyor and then towards a pulp polishing operation (not shown) as they emerge from the conveyor between rollers 26.

As is conventional in such an operation, the pulp covered conductors 23 are not intended to move laterally of their feedpaths as they move from the vat 18 around the conveyor 24 and into the polishing apparatus. However, in a conventional arrangement such a disposition of the pulp covered conductors would produce unnecessary wear in the regions indicated at 28 on the conveyor surface, i.e. those regions lying directly in contact with the pulp ribbons as they move through the apparatus. In a conventional arrangement the regions 30 lying between regions 28 would receive no wear.

Figure 7:
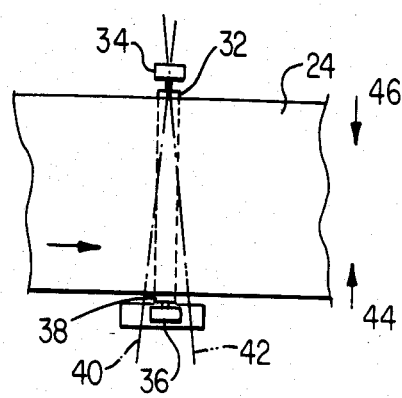
FIG. 7 is a view in the direction of arrow VII in FIG. 1 of the roller and on the same scale as in FIG. 1.

In the apparatus of this embodiment and according to the invention, provisions have been made to prevent the unnecessary wear over certain regions of the conveyor belt whereby a more uniform wear is produced substantially across the whole width of the conveyor belt so as to reduce the amount of wear at any one position. This is effected by causing transverse displacement of the conveyor belt 24 alternately and for a controlled distance in opposite directions across its feedpath. This movement is performed by enabling one of the belt supporting rollers 32 to be movable to change the angle subtended between its axis and the direction of movement of the belt so as to place a sideways force on the belt and hence cause its transverse displacement. As shown by FIG. 7, the roller 32 is mounted at its ends in self-aligning bearings 34 and 36. The bearing 36 and the corresponding end 38 of the roller are caused to be transversely movable, as will be described, to move the roller between a position in which its axis lies along line 40 and a position in which its axis lies along line 42, both lines shown chain dotted in FIG. 7. Movement of the roller to position 40 with the belt moving in the direction shown by the arrow causes the belt to move transversely in the direction of arrow 44. Conversely movement of the roller towards position 42 will cause the belt to move transversely in the direction of arrow 46.

Figure 3:
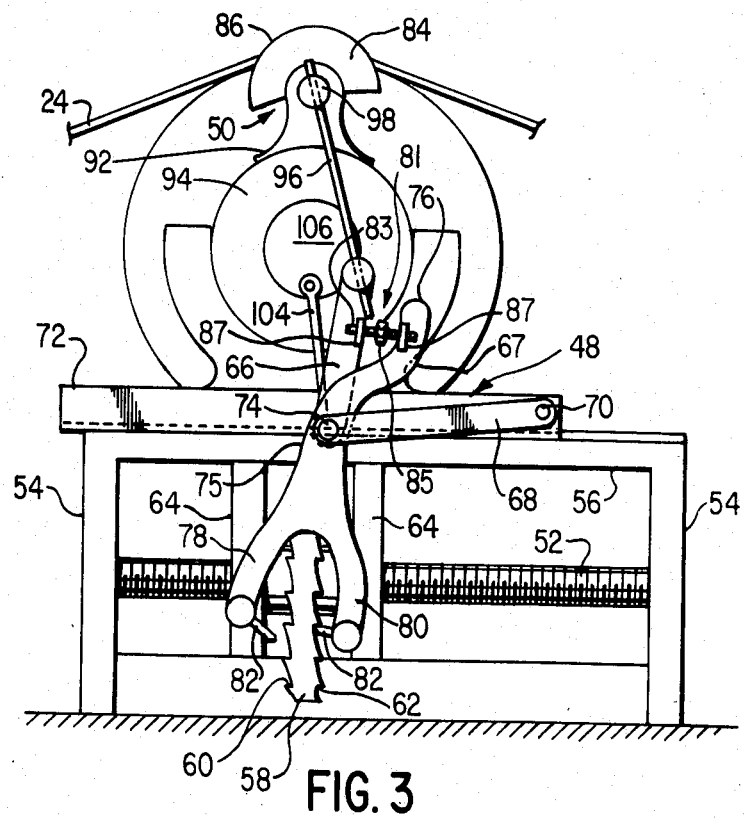
FIG. 3 is a side elevational view, on a larger scale than in FIG. 1, showing one end of a supporting roller for a conveyor belt of the apparatus and detail of a roller moving means for changing the angle of inclination of the roller relative to the direction of belt movement.
Figure 4:
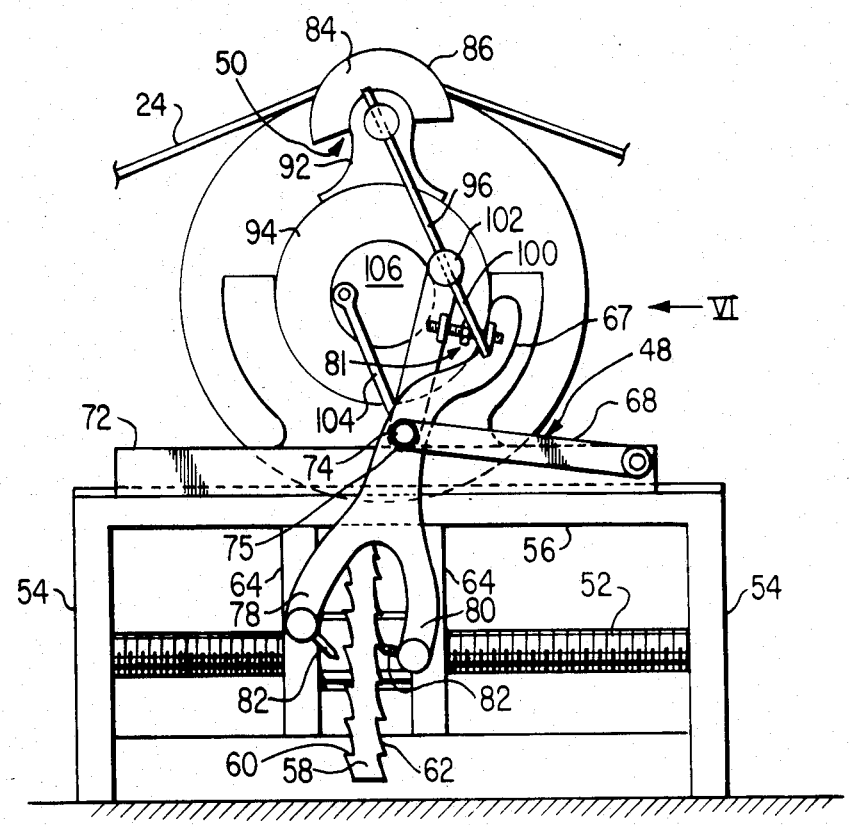
FIGS. 4 and 5 are views similar to FIG. 3 showing various stages in the operation of the roller moving means.
Figure 5:
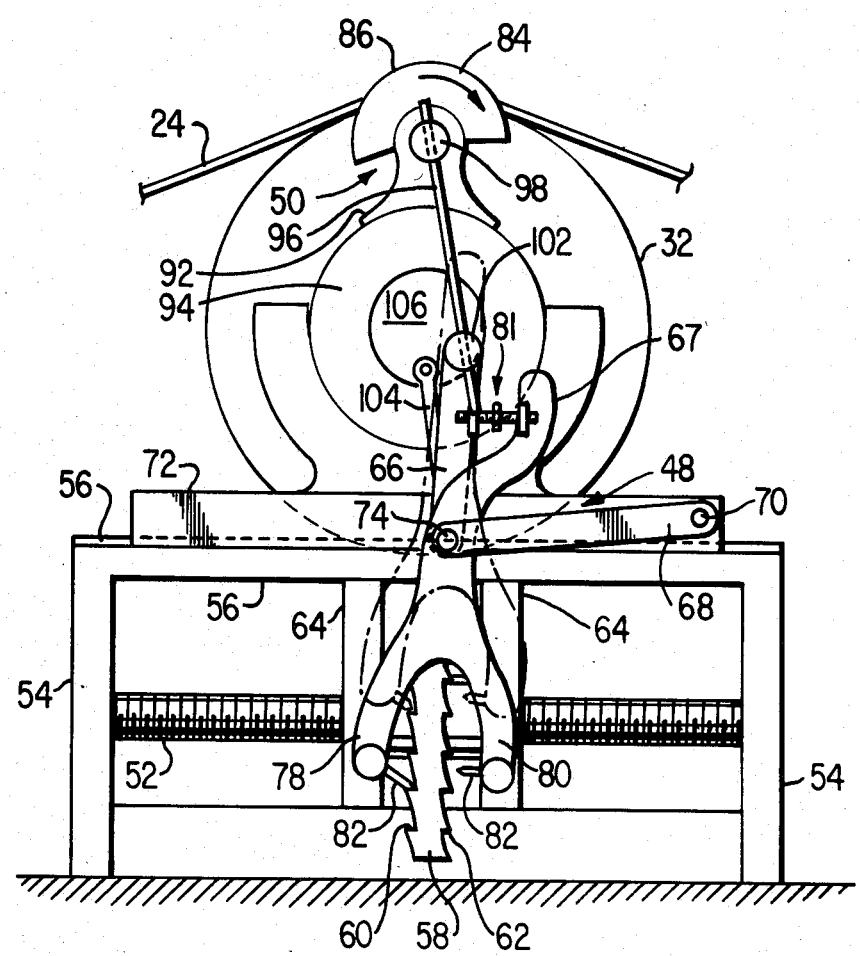

To effect this movement the conveyor assembly is provided with a roller moving means indicated generally at 48 in FIGS. 3, 4 and 5 and a triggering means indicated generally by arrow 50. The roller moving means comprises a screw-threaded member in the form of a spindle 52 which is held non-rotatably in position at its ends in two vertical side members 54 of a support. The support has an upper horizontal support bed 56 for supporting the one end 38 and bearing 36 of the roller as will be described. Another screw-threaded member, which is a ratchet nut 58, is carried upon the spindle 52. The ratchet nut 58 is formed with ratchet teeth 60 and 62 on opposite facing radial surfaces of the nut. The nut is received in bearings (not shown) mounted in bearing supports 64 which are also movable with the nut along the spindle.

The roller moving means also comprises a linkage which consists of a first link 66, a second link 67 and a control arm 68. The control arm 68 is pivoted at one end 70 to a carriage 72 which is movable together with the roller end 38 and the bearing 66 across the support bed. The bearing supports 64 form part of the carriage. The other end 74 of the control arm is pivoted to an intermediate position 75 of the link 67. The link 67 has an upper portion 76 which is cranked from position 75 and two depending arms 78 and 80. These two arms depend one on each side of the ratchet nut 58 and have ratchet engaging projections 82 for engaging the ratchet teeth, dependent upon the position of the link 67. As may be seen from a comparison of FIGS. 3 and 5, the link 67 is pivotally movable about the end 74 of the arm 68 from a first or normal position (FIG. 3) in which the ratchet teeth 62 are engaged by the arm 80, to a position in which the ratchet teeth 60 are engaged by the arm 78.

The link 66 is pivoted by a lower end about the end 74 of the arm 68. The link 66 extends upwards from the end 74 of arm 68 to be alongside, but spaced from, the cranked upper portion 76 of link 67. The two links are both to move as one member about the end 74 by a linkage adjustment means 81. This comprises an adjustment shaft 83 having two sections, oppositely screw-threaded, extending from an integral control adjustment nut 85. The two shaft sections are threadably engaged with two threaded holes in bosses 87 integral with and extending normal to the planes of the link 66 and the cranked end 76.

The triggering means is capable of moving the arm 66 between its two positions shown in FIGS. 3 and 5. The triggering means comprises a linkage positioning member 84 which is formed as a sector of a cone (as is clear from FIG. 6) and is thus formed with an arcuate surface 86. This arcuate surface 86 faces in a generally upward direction to contact the same side of the conveyor belt 24 as is contacted by the roller 32. The linkage positioning member is disposed directly at the end of the roller 32 with the arcuate surface 86 having its larger diameter end 88 (see FIG. 6) disposed further from the roller 32 (i.e. further from the median plane of the roller) than the smaller diameter end 90. Member 84 is pivotally mounted upon a support 92 which is in turn carried by a bearing housing 94 carrying the bearing 36 of the roller 32. The triggering means also comprises a triggering lever 96 which is mounted at one end through a shaft 98 which is an extension of the member 84 and is pivoted with it. An end section 100 of the lever 96 is slidably received through a hole (not shown) in a mounting 102 rotatably carried at the upper end of the link 66.

The linkage of the roller moving means also comprises a connecting rod 104 which is eccentrically mounted on the end of an extension shaft 106 for the roller 32. The rod 104 has a lower end 105 (FIG. 6) pivotally connected to the end 74 of the control arm and hence is pivotally connected at that position to the links 66 and 67.

In use of the apparatus, the pulp covered conductors move from the vat 18 and around the conveyor 24 and through the rollers 26 towards the polishing operation as discussed above. During this operation, the conveyor is driven and the roller moving means together with the triggering means described above effects continuous transverse movement of the conveyor belt alternately in the directions 44 and 46 (see FIG. 7) as will now be described.

Figure 6:
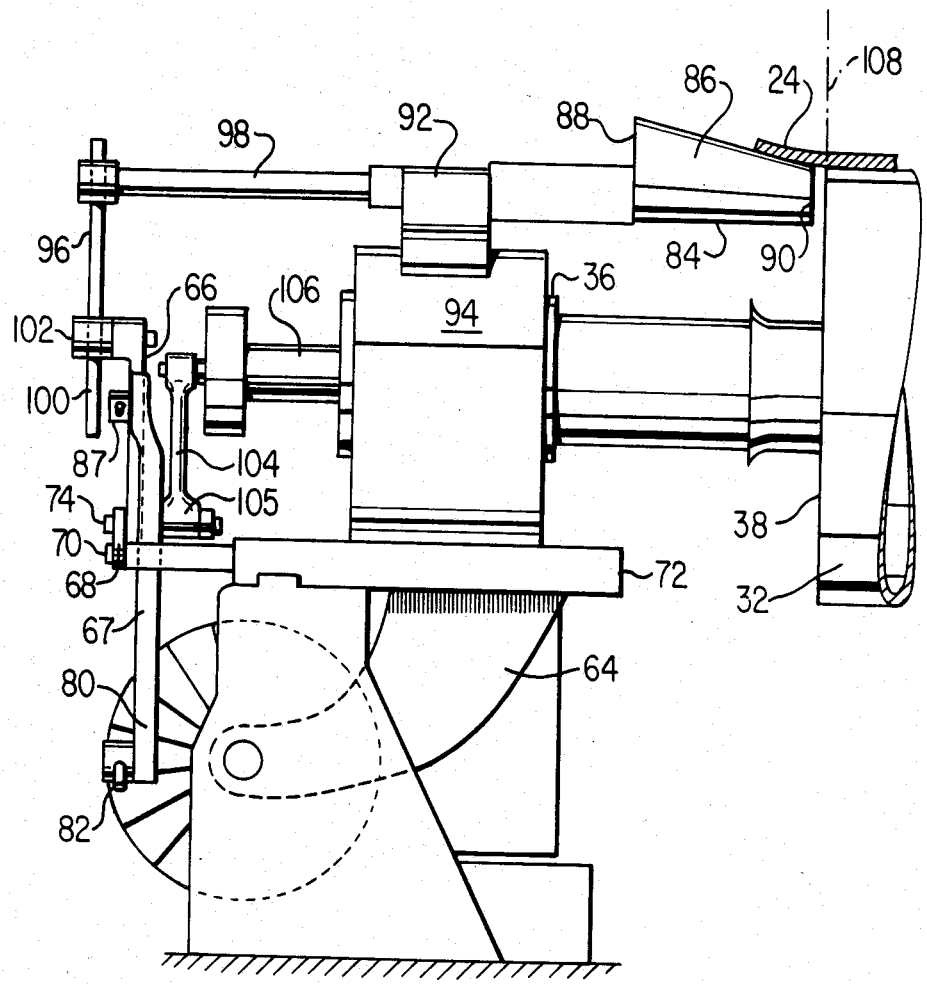
FIG. 6 is a side elevational view of the end of the roller and the roller moving means taken in the direction of arrow VI in FIG. 4.

Normally the links 66 and 67 are as in the position shown in FIG. 3, because the linkage comprising the links, control arm 68 and the connecting rod 104 are so balanced that their combined center of gravity forces the link 67 in that direction around end 74 of arm 68 to engage the arm 80 with the ratchet teeth 62. The link 67 assumes that position from the position of FIG. 5 when the conveyor belt reaches a location as shown in FIG. 6, in which it engages the surface 86 of member 84 only slightly or not at all. Such a position is shown for the near side of the belt in FIG. 6 as is indicated by chain dotted line 108. In this position, the belt has no influence upon the position of either the triggering means or the roller moving means thereby allowing the link 67 to revert to the position in FIG. 3. However in this position of the belt, the ratchet nut 58 has moved towards the left (FIG. 3) along the spindle 52 to such a location that the axis of the roller 32 lies towards or at the position 40 shown by FIG. 7.

As the conveyor belt moves along its path, it rotates the roller 32 and causes the connecting rod 104 to move the end 74 of arm 68 in a generally vertically oscillating fashion so that the links 66 and 67 move vertically. With the arm 80 engaging the ratchet teeth 62 (FIG. 3), upward movement of the links is a working stroke which rotates the nut 58 to cause it to move towards the right along screw spindle 52. This is shown from position in FIG. 3 to that of FIG. 4. Downward movement of the links is a lost motion. Thus the movement of the nut is intermittent thereby causing an intermittent movement of the bearing 36 and the corresponding end of the roller 32 towards its other extreme position 42 (FIG. 7). The inclination of the roller affects lateral movement of the belt. Thus with the roller inclined between its axial position 40 in FIG. 7 and a position normal to the direction of belt movement as it moves towards position 42, the belt moves laterally and progressively more slowly in the direction of arrow 44. After passing the normal position of the roller, the belt starts to move in the direction 46 in FIG. 7. The lateral belt movement is exceedingly slow compared with the main direction of movement of the belt so as not to cause the pulp ribbon covered conductors 23 to depart from their true paths across the conveyor as they move towards the polishing operation. Hence, it is intended that the conveyor will move slowly beneath the pulp ribbons while not subjecting them to significant force to cause them to depart from their true paths. The conveyor belt moves gradually across the roller until it commences to move upwardly onto the arcuate surface 86 as shown in full outline position in FIG. 6. As the belt moves up the inclined surface, it reaches a position to place enough force upon the arcuate member 84 to move about the shaft 98 in a clockwise direction as shown by the arrow in FIG. 5. This occurs with the roller axis at position 42 in FIG. 7. This in turn causes the triggering lever 96 to turn about the shaft 98 so as to cause the upper end 102 of the link 66 to move towards the left. This effects the pivoting movement of the links 66 and 67 about position 74 to remove the arm 80 from engagement with the teeth 62 and to urge the arm 84 into driving engagement with the teeth 60. A comparison of FIGS. 3 and 4 with FIG. 5 not only shows the change in relative position of the links 66 and 67 but also the movement towards the left of the end 102.

As the conveyor belt is further driven, downward movement of the links 66 and 67 is a working stroke to move the nut towards the left along the screw spindle 52 as shown by FIG. 5. As with nut movement towards position 42, its movement towards position 40 is intermittent. During the change in orientation of the roller, the conveyor belt gradually slows down in its transverse movement in the direction 46 and after the roller axis passes a position lying normal to the conveyor belt direction, the belt then starts to move in direction 44 as it is influenced by the new inclined position of the roller. It follows that as the roller moves towards its axis position 40 (FIG. 7), the conveyor belt is traveling in the direction 44 so that it gradually moves out of contact with the arcuate surface 86 once again.

As soon as the influence of the force of the conveyor belt upon the surface 86 is removed significantly, then the balancing effect of the linkage 66, 67, 68 and 104 reverts the position of link 67 back to that shown in FIG. 3 in which the arm 80 engages the ratchet teeth 62. This effects a change in rotational direction of the ratchet nut 58 to reverse the lateral movement of roller 32. As the roller moves towards the position 42 from its position normal to the conveyor belt direction, the conveyor belt once again starts to move in the direction 46 shown in FIG. 7.

After a period of use, if it is found that movement of the links 66 and 67 is not sufficiently positive, possibly because of wear, to ensure that the projections 82 engage the ratchet teeth 60 and 62 as required, then adjustment may be made using the adjustment means 81. Rotation of shaft 83 in the appropriate direction moves the cranked end 76 of link 67 towards or away from link 66 by rotation of the link 67 about end 74 of the arm 68. This effects the required movement of one or the other of the projections 82 into engagement with the teeth 60 or 62.

It follows from the above description that a simple mechanical linkage device including an adjustment means is used for controlling the exact position of the roller 32 between two limiting positions which, in turn, control the transverse movement of the belt across its feedpath. In effect this results in different parts of the belt contacting the underside of the pulp ribbons of the conductors as the belt very gradually slides transversely beneath these ribbons. As a result of this, and with the ensured assistance of the adjustment means, the conveyor belt receives substantially uniform wear across its entire width without any grooves or hollows being formed by virtue of sliding contact with the ribbons as they are drawn along their feedpaths. Hence, the assembly results in the use of a conveyor belt having a greater period of acceptable usage because extreme wear at any one position is not created.

Figure 8:
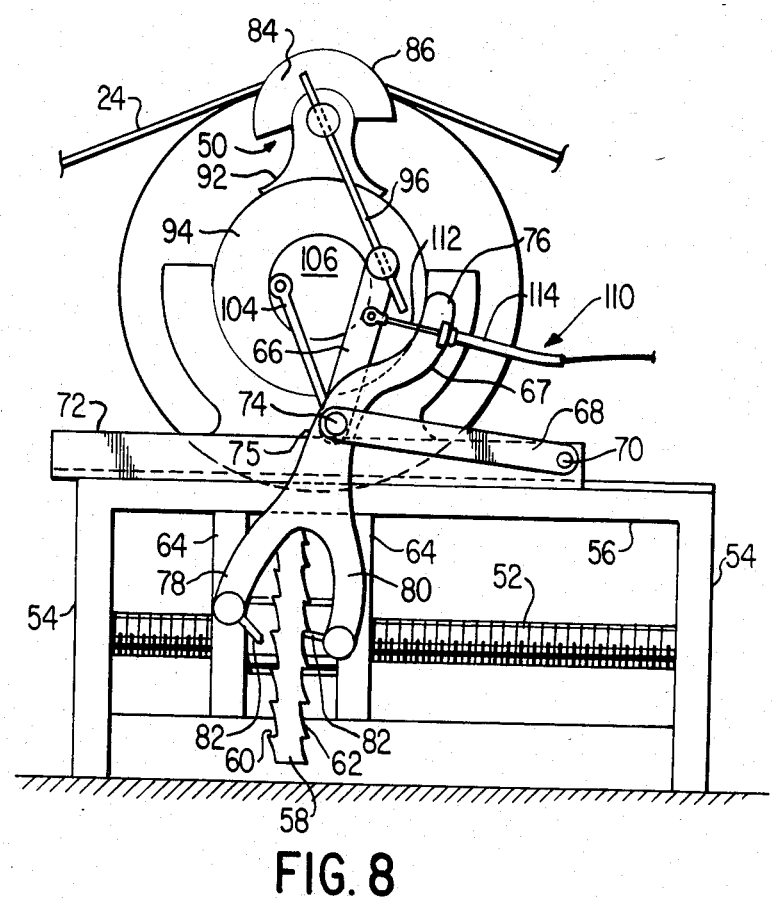
FIG. 8 is a side elevational view of a modification of the embodiment of the invention.

In a modification of the embodiment, and as shown by FIG. 8, the adjustment means is replaced by another adjustment means comprising a control cable 110 which connects link 66 with cranked end 76 of the link 67. An internal member 112 of the cable is pivoted to link 66 whereas an external or sheath member 114 is pivoted to link 76. Relative positional displacement of the links may thus be under remote control. This control may be manual or, alternatively, is computer operated by signals received from a monitoring means (not shown) which monitors lateral movement of the belt and is sensitive to be operable to read a signal to the computer when the lateral movement ceases. Cessation in movement, of course, indicates the lack of connection between the ratchet nut 58 and the projections 82.

What is claimed is:

1. A conveyor assembly comprising:
a conveyor belt and a plurality of conveyor belt supporting rollers, one of said rollers being movable to change the angle subtended between its axis and the direction of movement of the belt to place a sideways force on the belt and cause its displacement transversely while it is being driven, roller moving means for regularly periodically moving the roller in one direction to change the subtended angle from a first extreme angle at one side of a line normal to the direction of movement of the belt to a second extreme angle at the opposite side of said line normal to the direction of movement of the belt and then in the opposite direction to change said subtended angle from the second extreme angle to the first extreme angle so as to effect a regular periodic alternating transverse movement of the belt from one to another of two extreme positions of lateral displacement, the roller moving means comprising: a screw-threaded spindle; a ratchet nut threaded onto the spindle and having ratchet teeth on each of two oppositely facing radial surfaces; a linkage comprising a first link and a second link connected to the first link to pivot together with the first link about a common pivot point, the second link having two arms, one arm extending along each radial surface of the nut, the linkage being pivotable between two actuating positions and in each actuating position, an arm being actuably connected to the ratchet teeth on one radial surface to rotate the ratchet nut in one direction to move it in an appropriate direction along the threaded spindle with each actuating position of the linkage effecting an opposite directional movement of the ratchet nut from the other actuating position, one end of the roller transversely movable with its bearing upon a support together with the ratchet nut as it moves along the threaded spindle; linkage adjustment means operable to adjust the relative positions of the first link and the second link around the common pivot point to thereby adjust the degree of driving engagement of the second link with the ratchet nut; and a triggering means operable upon the belt reaching a certain location during its movement towards either extreme position of lateral displacement for pivoting the linkage between its two actuating positions to change the direction of rotation of the ratchet nut and hence the direction of movement of the roller.

2. An assembly according to claim 1 wherein the linkage further comprises a control arm which is pivoted at spaced locations to the linkage and to a carriage which carries the one end of the roller and the triggering means and the linkage upon the support, the linkage also comprising a connecting rod drivably connecting the linkage with the roller for effecting oscillating movement of the linkage relative to the ratchet nut so as to provide the intermittent rotation of the nut.

3. An assembly according to claim 2 wherein the adjustment means comprises an adjustable screw-threaded means extending between and screw-threadedly received by portions of the first and second links spaced from a pivotal position of the second link upon the first link.

4. An assembly according to claim 2 wherein the adjustment means comprises a control cable having an internal member pivoted to the first link and an external member pivoted to the second link to enable adjustment of the links to be controlled from a remote position.

* * * * *